(12) United States Patent
Kawaguchi et al.

(10) Patent No.: US 10,316,828 B2
(45) Date of Patent: Jun. 11, 2019

(54) ACTUATOR AND ALARM APPARATUS

(71) Applicant: Sony Corporation, Tokyo (JP)

(72) Inventors: Hiroto Kawaguchi, Kanagawa (JP); Tomoko Katsuhara, Kanagawa (JP); Yasuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 15/328,576

(22) PCT Filed: Jun. 5, 2015

(86) PCT No.: PCT/JP2015/002849
§ 371 (c)(1),
(2) Date: Jan. 24, 2017

(87) PCT Pub. No.: WO2016/017057
PCT Pub. Date: Feb. 4, 2016

(65) Prior Publication Data
US 2017/0211553 A1 Jul. 27, 2017

(30) Foreign Application Priority Data
Aug. 1, 2014 (JP) .................................. 2014-158211

(51) Int. Cl.
*F03G 7/06* (2006.01)

(52) U.S. Cl.
CPC .............. *F03G 7/065* (2013.01); *F03G 7/06* (2013.01)

(58) Field of Classification Search
CPC ................................... F03G 7/06; F03G 7/065

USPC .................... 60/527–529; 310/306, 307
See application file for complete search history.

(56) References Cited

U.S. PATENT DOCUMENTS

| | | | |
|---|---|---|---|
| 5,622,482 A | 4/1997 | Lee | |
| 2007/0137196 A1 | 6/2007 | Hamaguchi et al. | |
| 2008/0034750 A1* | 2/2008 | Gao | ........................ F03G 7/065 60/527 |
| 2010/0212312 A1 | 8/2010 | Rudduck | |
| 2013/0160445 A1 | 6/2013 | Olson et al. | |
| 2014/0210219 A1* | 7/2014 | Pipp | ........................ F03G 7/065 292/144 |

FOREIGN PATENT DOCUMENTS

| | | | | |
|---|---|---|---|---|
| DE | 10155119 A1 * | 5/2003 | ............... | B64C 3/48 |
| JP | 63-21367 A | 1/1988 | | |
| JP | 3-37433 A | 2/1991 | | |
| JP | 4-347796 A | 12/1992 | | |
| JP | 10-504080 A | 4/1998 | | |
| JP | 2006-300914 A | 11/2006 | | |
| JP | 2007-162612 A | 6/2007 | | |
| JP | 2008-138593 A | 6/2008 | | |

* cited by examiner

*Primary Examiner* — Mark A Laurenzi
*Assistant Examiner* — Mickey H France
(74) *Attorney, Agent, or Firm* — Wolf, Greenfield & Sacks, P.C.

(57) ABSTRACT

This actuator includes: a holder; a slider; a wire; and a pair of electrode units. The slider is slidably held by the holder. The wire is a member that is locked at the slider, the wire causing the slider to slide by contracting in at least a line length direction when being energized. One end of the wire is bonded to one of the electrode units, and the other end of the wire is bonded to the other of the electrode units.

10 Claims, 12 Drawing Sheets

ACTUATOR AND ALARM APPARATUS

CROSS-REFERENCE TO RELATED APPLICATIONS

This application claims the benefit under 35 U.S.C. § 371 as a U.S. National Stage Entry of International Application No. PCT/JP2015/002849, filed in the Japanese Patent Office on Jun. 5, 2015, which claims priority to Japanese Patent Application Number JP2014-158211, filed in the Japanese Patent Office on Aug. 1, 2014.

TECHNICAL FIELD

The present technology relates to an actuator using a shape-memory alloy wire and an alarm apparatus that uses this actuator to inform a user of alarm.

BACKGROUND ART

Some actuators that drive a driven body use a wire formed of a shape-memory alloy. This kind of actuator uses a principle of restoring the remembered length when the temperature of the wire formed of the shape-memory alloy reaches a predetermined temperature by heating. Specifically, when the driven body is connected to one end of the wire and the wire is heated by being energized, the wire contracts, and the displacement corresponding to the amount of the wire contraction is given to the driven body (see, for example, Patent Literature 1).

CITATION LIST

Patent Literature

Patent Literature 1: Japanese Patent Application Laid-open No. 2008-138593

DISCLOSURE OF INVENTION

Technical Problem

It is desirable to configure an actuator using a shape-memory alloy wire so that the shape-memory alloy wire and another part have as little contact with each other as possible in order to reduce the heat leakage from the shape-memory alloy wire. Therefore, it is difficult to achieve a thickness reduction and size reduction.

Further, an actuator using a shape-memory alloy wire is suitable for being used to simply move a driven body between two positions. However, for example, in the case where a relatively large stress is applied to the driven body, there is a possibility that the structure is complicated, e.g., a connection portion between the driven body and the shape-memory alloy wire needs to be reinforced, which makes it difficult to achieve a thickness reduction and size reduction.

Further, in the case where the driven body is desired to be moved in a direction different from the direction of contraction of the shape-memory alloy wire, because it needs to provide a complicated mechanism for changing the direction of movement, there is a possibility that the structure is complicated after all, which makes it difficult to achieve a thickness reduction and size reduction.

Further, because the thickness reduction and size reduction of an actuator enable application and introduction to an apparatus, which have been difficult, it is strongly desired to achieve them.

It is an object of the present technology to provide an actuator and an alarm apparatus that are capable of achieving thickness reduction and size reduction.

Solution to Problem

In order to solve the above-mentioned problem, an actuator according to a first embodiment of the present technology includes a holder, a slider, a wire, and a pair of electrode units.

The slider is slidably held by the holder.

The wire is locked at the slider, the wire causing the slider to slide by contracting in at least a line length direction when being energized.

One end of the wire is bonded to one of the electrode units, and the other end of the wire is bonded to the other of the electrode units.

The actuator may further include an elastic plate.

The elastic plate is a member in which one end portion of the elastic plate being fixed to the slider, the other end portion of the elastic plate being fixed to a position, the position being away from the slider in a sliding direction of the slider, the elastic plate being elastically deformed in a direction perpendicular to a sliding surface of the slider by a change in a distance between the one end portion and the other end portion along with sliding of the slider when the wire is energized.

By the actuator according to the first embodiment of the present technology, with a little number of parts, it is possible to generate displacement for elastically deforming the elastic plate by the movement of the contraction of the wire, for example. Further, the wire and the elastic plate are not in contact with each other on a large surface. Therefore, it is possible to reduce thermal leakage by the thermal conduction from the wire.

In the actuator, the elastic plate may be elastically deformed in a direction away from the sliding surface at the time of the energization.

In the actuator, the elastic plate may be in a state of being elastically deformed in the direction away from the sliding surface by initial distortion at the time of non-energization.

Accordingly, it is possible to reliably cause the elastic plate to be elastically deformed in a predetermined direction away from the sliding surface when the wire is energized. Specifically, it is possible to constantly achieve displacement caused by certain elastic deformation.

In the actuator, the pair of electrode units may be provided to the holder.

In the actuator, the wire may be pulled across a surface in parallel with the sliding surface. Accordingly, it is possible to place the elastic plate and the wire so that they come close to each other in the direction perpendicular to the sliding surface, and constitute a thin, small-sized actuator.

The actuator may further include a contact prevention wall that prevents the wire pulled across the surface in parallel with the sliding surface from being in contact with each other. Accordingly, it is possible to prevent an operation problem such as the reduction in the amount of displacement of the elastic plate due to the contact of the wire from occurring.

In the actuator, the elastic plate may include a first elastic plate and a second elastic plate that are elastically deformed in directions away from each other from the sliding surface at the time of the energization.

Accordingly, with a little number of parts, it is possible to generate displacement in directions away from each other from the sliding surface.

In the actuator, the slider may include a first slider and a second slider slidably held by the holder along the same axial direction, and the wire may be locked at the first slider and the second slider, and causes the first slider and the second slider to slide in a direction pulling each other by contracting in at least the line length direction when being energized.

Further, the elastic plate may include a first elastic plate, one first end portion of the first elastic plate being fixed to the first slider, the other second end portion of the first elastic plate being fixed to a position, the position being away from the first slider in a sliding direction of the first slider, the first elastic plate being elastically deformed in a direction perpendicular to a sliding surface of the first slider by a change in a distance between the first end portion and the second end portion along with sliding of the first slider when the wire is energized, and a second elastic plate, one third end portion of the second elastic plate being fixed to the second slider, the other fourth end portion of the second elastic plate being fixed to a position, the position being away from the second slider in a sliding direction of the second slider, the second elastic plate being elastically deformed in a direction perpendicular to a sliding surface of the second slider by a change in a distance between the third end portion and the fourth end portion along with sliding of the second slider when the wire is energized.

According to this actuator, with a little number of parts, it is possible to generate displacement for elastically deforming the first elastic plate and the second elastic plate by the movement of the contraction of the wire. Further, the first elastic plate and the second elastic plate are not in contact with each other on a large surface. Therefore, it is possible to reduce thermal leakage by the thermal conduction from the wire.

An alarm apparatus according to a second embodiment of the present technology includes an actuator and a strip-shaped member.

The actuator includes a holder, a slider slidably held by the holder, a wire locked at the slider, the wire causing the slider to slide by contracting in at least a line length direction when being energized, and a pair of electrode units, one end of the wire being bonded to one of the electrode units, the other end of the wire being bonded to the other of the electrode units.

The strip-shaped member is a member in which one end portion of the strip-shaped member being fixed to the slider of the actuator, the other end portion of the strip-shaped member being fixed to an end portion of the holder in a sliding direction of the slider at the time of the energization.

This alarm apparatus can be wrapped around, for example, a wrist of a human for use because the actuator can be configured to be thin and small. When the length of the loop formed by the actuator and the strip-shaped member is reduced at the time of energization, the wrist is tightened. This feeling of tightness is given to a human as information such as notification of occurrence of some kind of event and content of the event.

Advantageous Effects of Invention

As described above, according to the present technology, it is possible to provide an actuator and an alarm apparatus that are capable of achieving thickness reduction and size reduction.

It should be noted that the effect described here is not necessarily limitative and may be any effect described in the present disclosure.

MODE(S) FOR CARRYING OUT THE INVENTION

Hereinafter, embodiments of the present technology will be described with reference to the drawings.

<First Embodiment>

Figure 1:
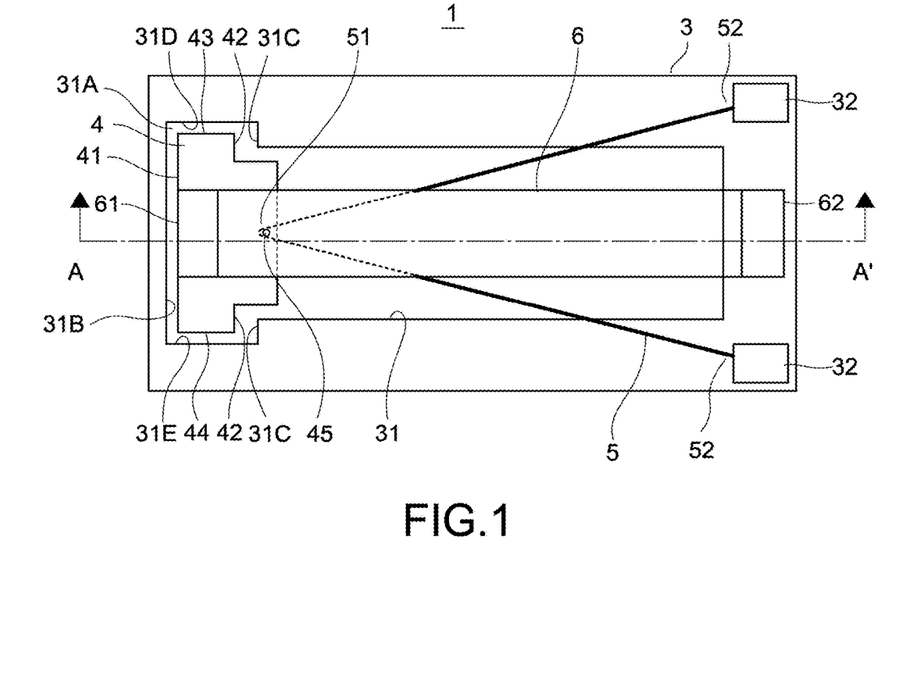
FIG. 1 An exploded perspective view showing the configuration of an actuator 1 according to a first embodiment of the present technology.

FIG. 1 is a plan view showing the configuration of an actuator 1 according to a first embodiment of the present technology.

Figure 3:
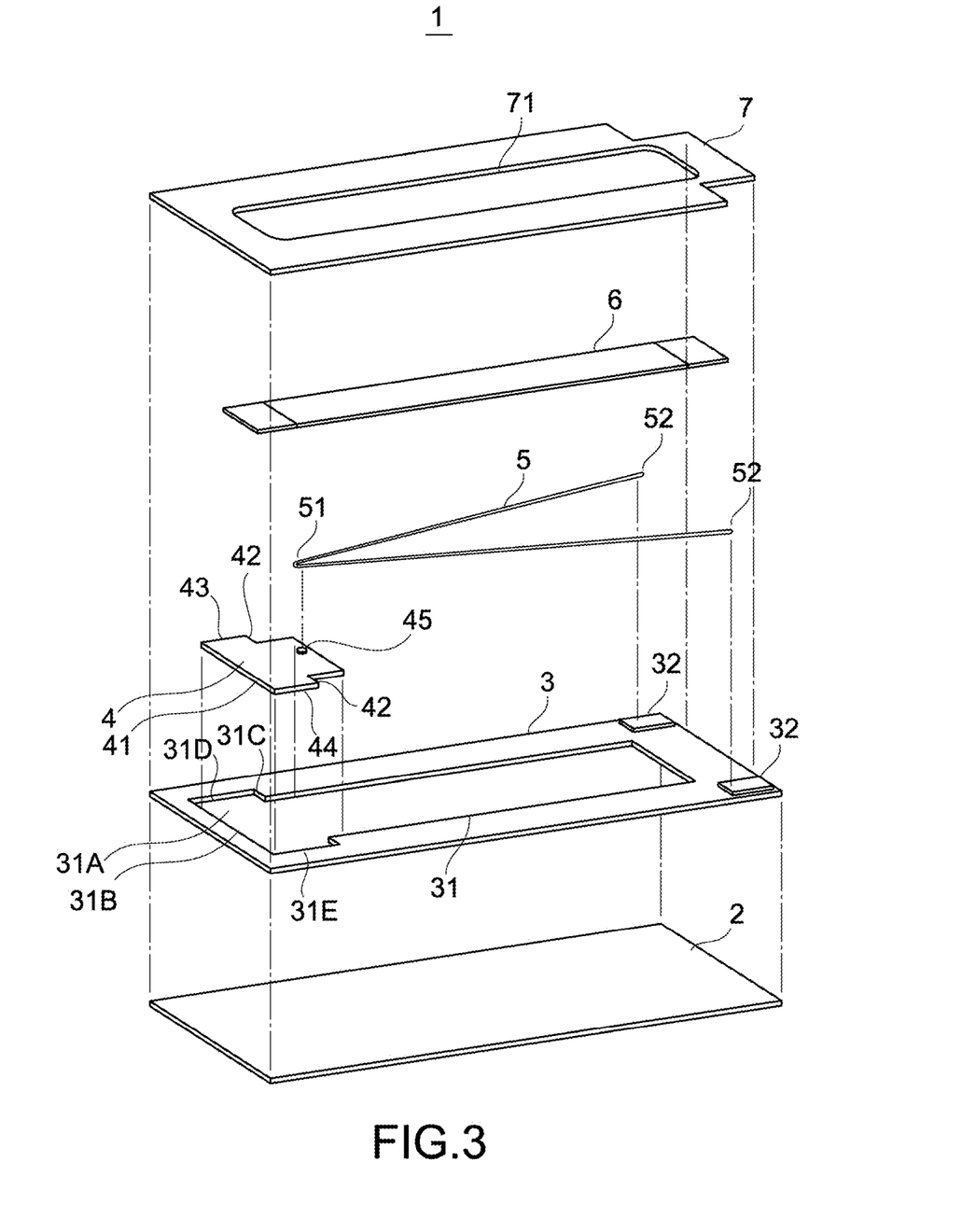
FIG. 3 A cross-sectional view of the actuator 1 in FIG. 2.

FIG. 3 is an exploded perspective view showing the configuration of the actuator 1 in FIG. 1 excluding a base plate 2 and a top plate 7.

Figure 2:
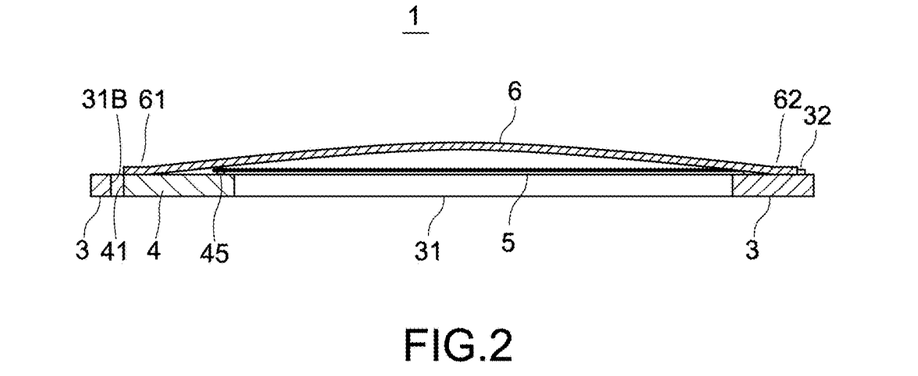
FIG. 2 A plan view showing the configuration of the actuator 1 in FIG. 1 excluding a base plate 2 and a top plate 7.

FIG. 2 is a cross-sectional view of the actuator 1 in FIG. 1.

As shown in these figures, this actuator 1 includes the base plate 2, a holder 3, a slider 4, a shape-memory alloy wire 5, an elastic plate 6, and the top plate 7.

The base plate 2 is formed of, for example, a rectangular thin plate member. On the base plate 2, the holder 3 is fixed.

The holder 3 is formed of, for example, a rectangular thin plate member. In the holder 3, an opening portion 31 is formed. One end portion of the opening portion 31 in an X-axis direction is used as a slider holding space 31A in which the slider 4 is slidably held in the X-axis direction. In more detail, the slider 4 has a thickness similar to that of the holder 3, and is three-dimensionally held in the three-dimensional space formed by the slider holding space 31A of the holder 3, the upper surface of the base plate 2, and the lower surface of the top plate 7.

The inner wall surface of the slider holding space 31A of the holder 3 functions as stopper surfaces 31B and 31C and slide guide surfaces 31D and 31E. The stopper surfaces 31B and 31C are respectively brought into contact with end surfaces 41 and 42 of the slider 4 in the X-axis direction to limit the sliding range. The slide guide surfaces 31D and 31E are respectively brought into contact with end surfaces 43 and 44 of the slider 4 in a Y-axis direction to guide the sliding.

The shape-memory alloy wire 5 is a wire formed of a shape-memory alloy. In this embodiment, one shape-memory alloy wire 5 bent in a V-shape at a central portion 51 is used. The central portion 51 of the shape-memory alloy wire 5 is locked at a locking portion 45 provided to the slider 4. End portions 52, 52 of the shape-memory alloy wire 5 are bonded to a pair of electrode units 32, 32 provided on the upper surface of the holder 3. Specifically, the shape-memory alloy wire 5 is placed to be pulled across a surface in parallel with the sliding surface of the slider 4. The pair of electrode units 32, 32 is provided on the surface of the one end portion of the holder 3 in the X-axis direction. On the other end portion of the holder 3 in the X-axis direction, the slider holding space 31A is provided. In more detail, the pair of electrode units 32, 32 is provided at positions away from each other from the central position of the holder 3 in the Y-axis direction on the surface of the one end portion of the holder 3.

Figure 4:
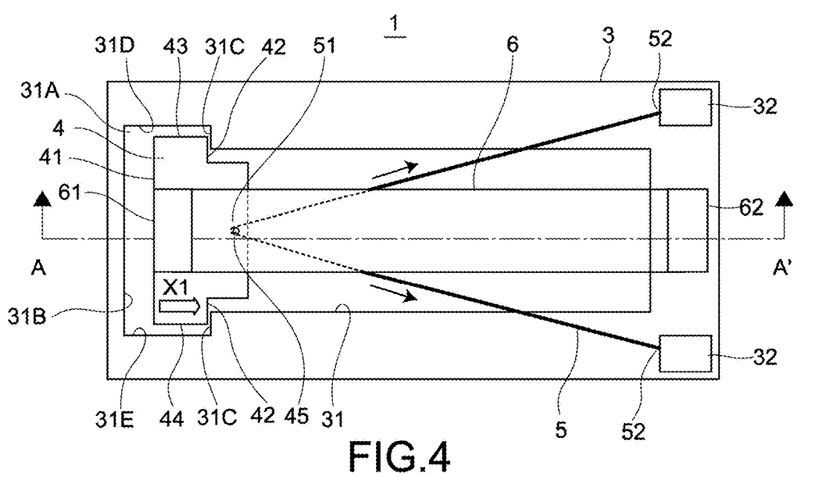
FIG. 4 A plan view showing the actuator 1 in FIG. 1 when being energized.
Figure 5:
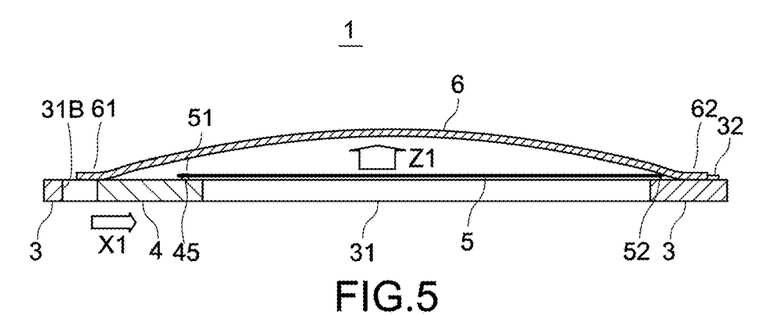
FIG. 5 A cross-sectional view showing the actuator 1 in FIG. 2 when being energized.

To the shape-memory alloy wire 5, current flows from an energization circuit (not shown) via the pair of electrode units 32, 32. When the temperature of the shape-memory alloy wire 5 has reached a predetermined temperature (specific temperature) by the joule heat generated by the current flowing through the shape-memory alloy wire 5, the shape-memory alloy wire 5 contracts in a line length direction. Since the central portion 51 of the shape-memory alloy wire 5 is locked at the locking portion 45 provided to the slider 4, the slider 4 is pulled toward the side of the bonding points of the end portions 52, 52 of the shape-memory alloy wire 5, and slides in an X1 direction in the slider holding space 31A when the shape-memory alloy wire 5 contracts in the line length direction, as shown in FIG. 4 and FIG. 5.

Further, when the energization to the shape-memory alloy wire 5 is stopped and the temperature of the shape-memory alloy wire 5 falls below the predetermined temperature (specific temperature), the shape-memory alloy wire 5 restores the original length before contraction. As a result, the slider 4 slides in the slider holding space 31A of the holder 3 in a direction opposite to the X1 direction and returns to the position shown in FIG. 1 and FIG. 2.

The elastic plate 6 is formed of a thin plate elastic member. An end portion 61 of the elastic plate 6 is fixed to the slider 4, and the other end portion 62 of the elastic plate 6 is fixed to the one end portion of the holder 3 in the X-axis direction. On the other end portion of the holder 3 in the X-axis direction, the slider holding space 31A is provided.

The distance between the fixed points of the elastic plate 6 is changed along with sliding of the slider 4 in the X-axis direction. When the shape-memory alloy wire 5 is energized, the slider 4 slides in the slider holding space 31A in the X1 direction, and the distance between the fixed points of the elastic plate 6 is decreased. At this time, the elastic plate 6 is elastically deformed in a Z1 direction as shown in FIG. 5 by receiving pressure from the side of the fixed points, and thus is in a predetermined warped state.

In this actuator 1, slight warpage in the direction toward the top plate 7 (in the Z1 direction) is given to the elastic plate 6 as the initial distortion when the slider 4 is located at the position where the shape-memory alloy wire 5 is not energized (position shown in FIG. 1 and FIG. 2). Accordingly, it is possible to reliably make the elastic plate 6 in a predetermined warped state in which the elastic plate 6 is elastically deformed in the direction toward the top plate 7 (in the Z1 direction), when the shape-memory alloy wire 5 is energized.

When the slider 4 slides in the slider holding space 31A in the direction opposite to the X1 direction after the energization to the shape-memory alloy wire 5 is stopped, the distance between the fixed portions of the elastic plate 6 is increased. As a result, the elastic plate 6 returns to a slight warped state by the initial distortion.

The top plate 7 is formed of, for example, a rectangular thin plate member. At the position of the top plate 7, which substantially faces the elastic plate 6, an opening portion 71 is provided. This opening portion 71 is a portion for making at least a part of the elastic plate 6 in the predetermined warped state when the shape-memory alloy wire 5 is energized project to the position higher than the upper surface of the top plate 7.

As described above, in this actuator 1, it is possible to make the slider 4 slide by the movement of the contraction of the shape-memory alloy wire 5 in the line length direction when being energized, elastically deform the elastic plate 6 by decreasing the distance between the fixed points of the elastic plate 6 whose one end is fixed to this slider 4, and generate displacement in a direction perpendicular to the sliding surface of the slider 4 (in the Z-axis direction). That is, with a little number of parts, it is possible to generate displacement for elastically deforming the elastic plate 6 by the movement of the contraction of the shape-memory alloy wire.

Further, because this actuator 1 includes the base plate 2, the holder 3, the slider 4, the elastic plate 6, and the top plate 7 combined in the plate thickness direction, which are each formed of a thin plate member, and the shape-memory alloy wire 5 is placed to be pulled across the surface direction of the plate parts, it is possible to achieve a thickness reduction and size reduction.

[Consideration on Energy Efficiency of Actuator 1 According to this Embodiment]

Next, the energy efficiency of the actuator 1 according to this embodiment will be considered.

In order to cause the shape-memory alloy wire 5 to contract, it needs to heat the shape-memory alloy wire 5 to a predetermined temperature (variant temperature) by joule heat by flowing current through the shape-memory alloy wire 5. In this regard, there is a problem of thermal leakage. This is because when heat is leaked from the shape-memory alloy wire 5, the energy efficiency of the actuator 1 is reduced by the amount corresponding to the leakage.

The main ways of the thermal leakage from the shape-memory alloy wire 5 include thermal conduction caused by the contact of another part with the shape-memory alloy wire 5, and thermal diffusion from the shape-memory alloy wire 5 or a part that is in thermal contact with the shape-memory alloy wire 5 to the atmosphere.

Now, the thermal conduction will be focused on. In order to reduce the thermal conduction as much as possible, the area of another member, which is in contact with the shape-memory alloy wire 5, has to be reduced as much as possible. In this embodiment, because the shape-memory alloy wire 5 and the elastic plate 6 are coupled to the slider 4, a positional relationship between the shape-memory alloy wire 5 and the elastic plate 6 in which they are close to each other in the vicinity of the slider 4 is established. However, the elastic plate 6 is erected at a position higher than the height position of the shape-memory alloy wire 5 erected, and slight warpage in the direction away from the shape-memory alloy wire 5 (in the Z1 direction) is given to the elastic plate 6 as the initial distortion. Accordingly, the shape-memory alloy wire 5 and the elastic plate 6 are not in contact with each other on a large surface. Therefore, it is possible to reduce thermal leakage by the thermal conduction from the shape-memory alloy wire 5.

<First Modified Example>

Next, a first modified example of an actuator 1a according to the first embodiment will be described.

Figure 6:
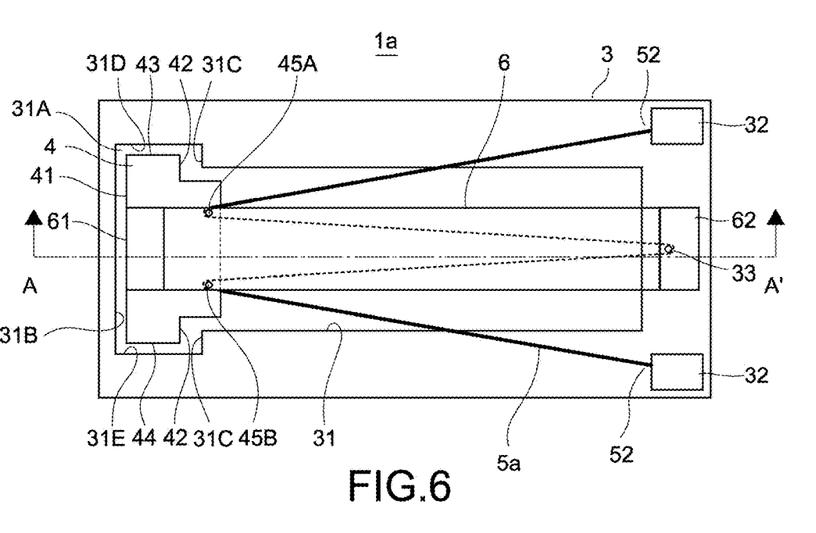
FIG. 6 A plan view showing an actuator 1a according to a first modified example.

FIG. 6 is a plan view showing the actuator 1a according to the first modified example.

In this actuator 1a, two locking portions 45A and 45B are provided to the slider 4, and a locking portion 33 is provided to the one end portion of the holder 3 in the X-axis direction. On the other end portion of the holder 3 in the X-axis direction, the slider holding space 31A is provided. A shape-memory alloy wire 5a having the end portions 52, 52 bonded to the pair of electrode units 32, 32 provided on the upper surface of the holder 3 is bridged to the three locking portions 45A, 45B, and 33 in a W-shape.

Accordingly, the longer shape-memory alloy wire 5a can be bridged between the slider 4 and the holder 3, it is possible to increase the amount of contraction of the shape-memory alloy wire 5a when being energized. That is, it is possible to increase the stroke of the slider 4 and the amount of displacement by the elastic deformation of the elastic plate 6.

<Second Modified Example>

Figure 7:
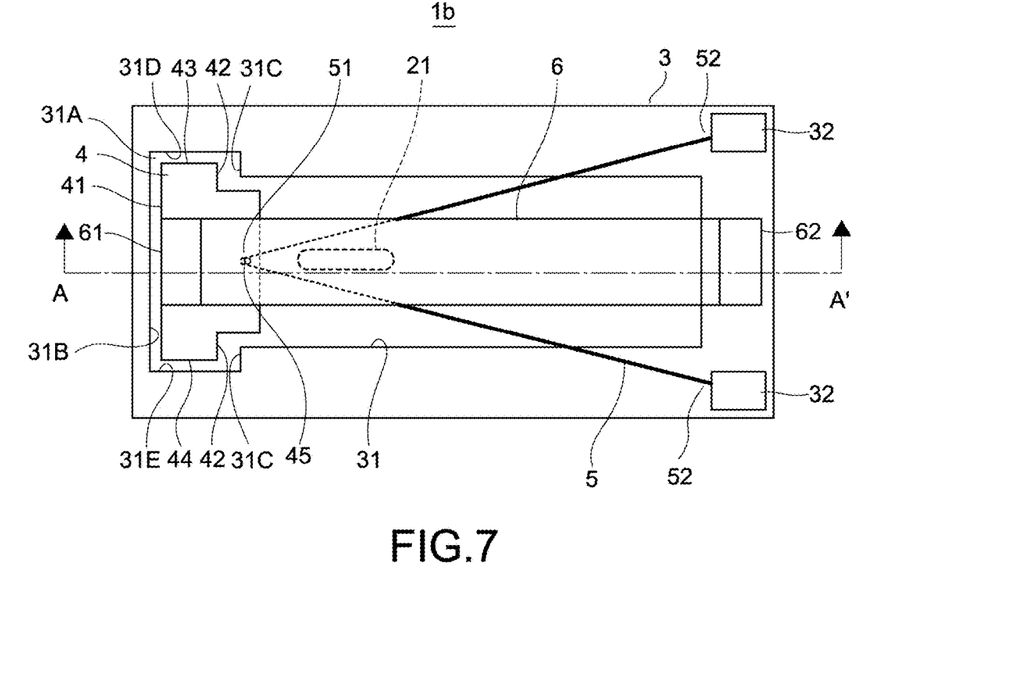
FIG. 7 A plan view showing an actuator 1b according to a second modified example.
Figure 8:
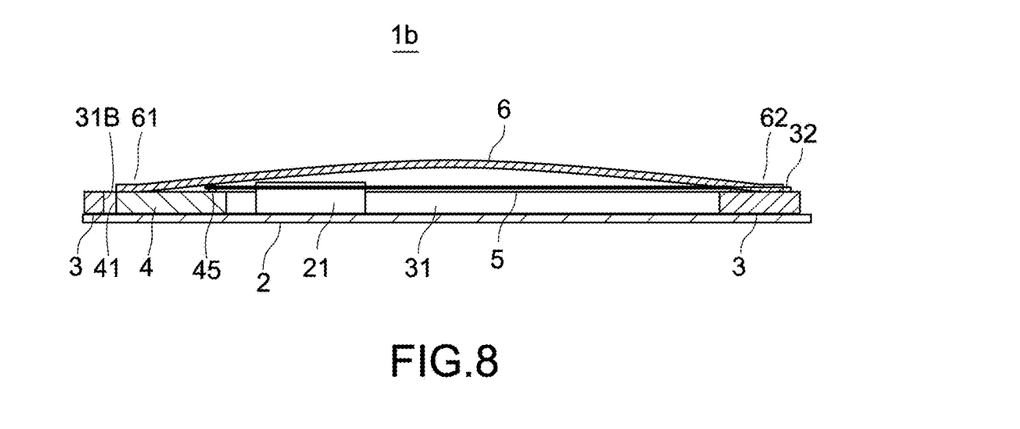
FIG. 8 A cross-sectional view of the actuator 1b according to the second modified example.

FIG. 7 is a plan view showing an actuator 1b according to a second modified example. FIG. 8 is a cross-sectional view of the actuator 1b according to the second modified example.

To the actuator 1b, a contact prevention wall 21 is provided to prevent the contact of the shape-memory alloy wire 5 in front of the folded portion. The contact prevention wall 21 can be provided on the base plate 2, for example.

Accordingly, it is possible to prevent an operation problem such as the reduction in the amount of displacement of the elastic plate 6 due to the contact of the shape-memory alloy wire 5 in front of the folded portion from occurring.

<Third Modified Example>

Figure 9:
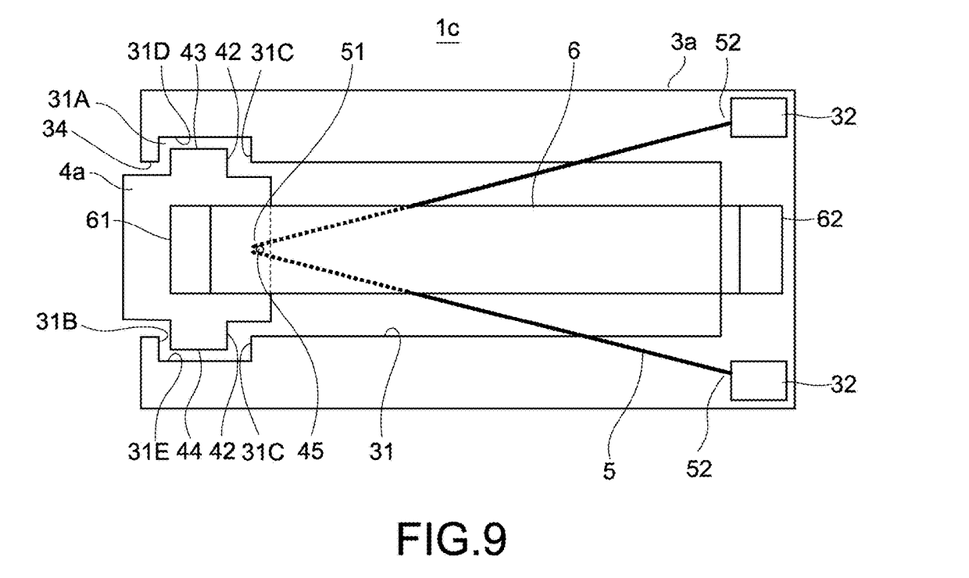
FIG. 9 A plan view showing an actuator 1c according to a third modified example.
Figure 10:
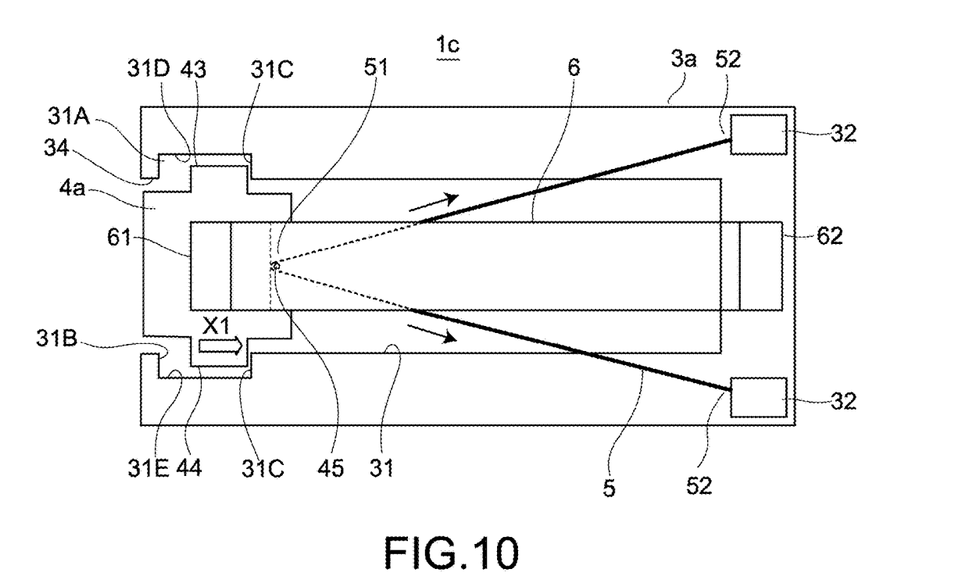
FIG. 10 A plan view showing the actuator 1c according to the third modified example when being energized.

FIG. 9 and FIG. 10 are each a plan view showing an actuator 1c according to a third modified example.

This actuator 1c is configured so that the sliding displacement of a slider 4a is made to be an output of the actuator 1c.

Specifically, in this actuator 1c, when the shape-memory alloy wire 5 is energized, the shape-memory alloy wire 5 contracts in the line length direction as shown in FIG. 10, and the slider 4a slides in the slider holding space 31A in the X1 direction by being pulled toward the side of the bonding portions of the end portions 52, 52 of the shape-memory alloy wire 5.

When the energization to the shape-memory alloy wire 5 is stopped and the temperature of the shape-memory alloy wire 5 falls below a predetermined temperature (specific temperature), the shape-memory alloy wire 5 restores the original length before contraction. As a result, the slider 4a slides in the slider holding space 31A of a holder 3a in the direction opposite to the X1 direction, and returns to the position shown in FIG. 9.

Figure 11:
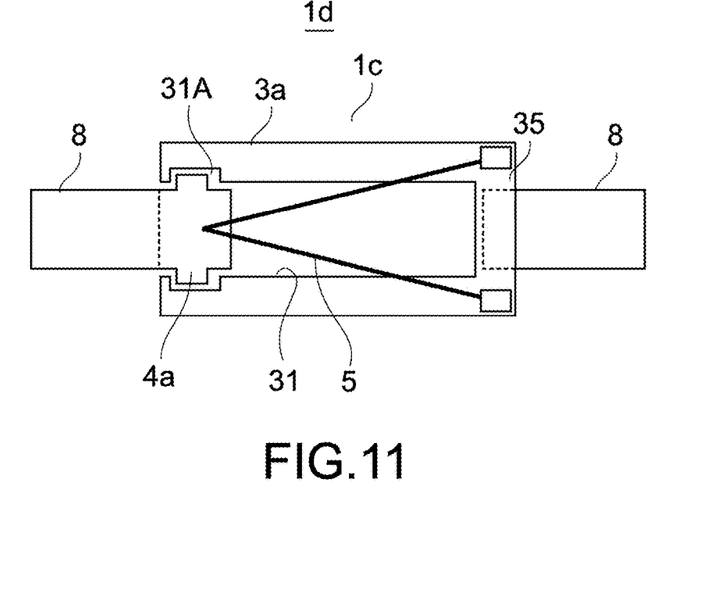
FIG. 11 A plan view showing the actuator 1c according to the third modified example.

FIG. 11 is a plan view showing an alarm apparatus 1d as an application example of the actuator 1c according to the third modified example.

Figure 12:
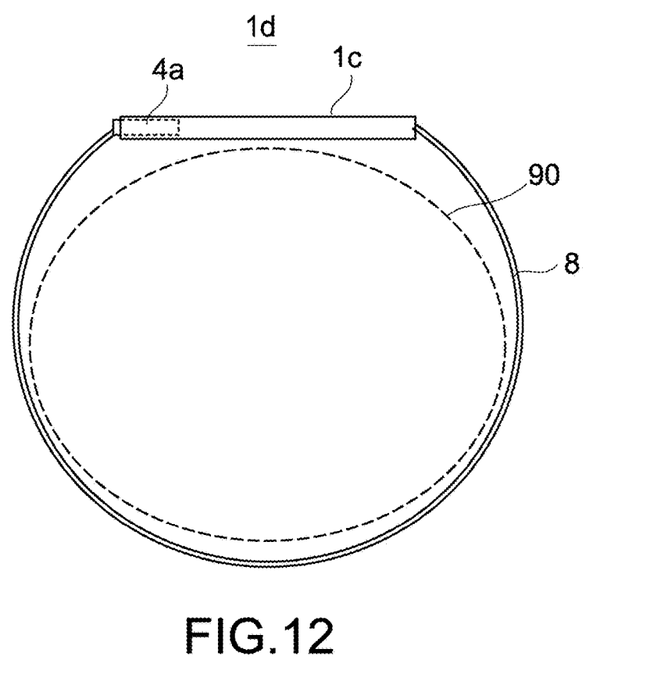
FIG. 12 A plan view showing an alarm apparatus 1d as an application example of the actuator 1c according to the third modified example.

FIG. 12 is a side view of the alarm apparatus 1d in FIG. 11.

In this alarm apparatus 1d, one end portion of a strip-shaped member 8 is connected to an end portion of the slider 4a of the actuator 1c in the X-axis direction, and the other end portion of the strip-shaped member 8 is connected to an end portion 35 of the holder 3 opposite to the end portion to which the slider holding space 31A is provided. Accordingly, the alarm apparatus 1d in which the actuator 1c and the strip-shaped member 8 forms one loop is configured.

Figure 13:
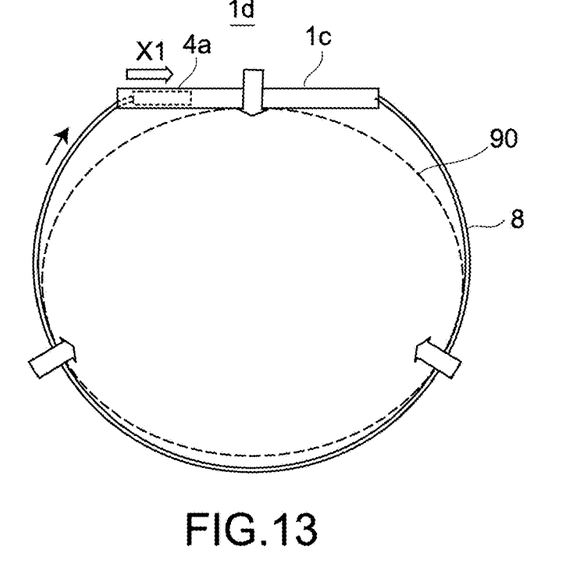
FIG. 13 A side view showing the alarm apparatus 1d in FIG. 11 when being energized.

In this alarm apparatus 1d, the slider 4a slides in the slider holding space 31A in the X1 direction when the shape-memory alloy wire 5 is energized, thereby reducing the length of the loop formed by the actuator 1c and the strip-shaped member 8 as shown in FIG. 13.

Such alarm apparatus 1d can be wrapped around, for example, a wrist 90 of a human for use. When the length of the loop formed by the actuator 1c and the strip-shaped member 8 is reduced, the wrist 90 is tightened. This feeling of tightness is given to a human as information such as notification of occurrence of some kind of event and content of the event.

Figure 14:
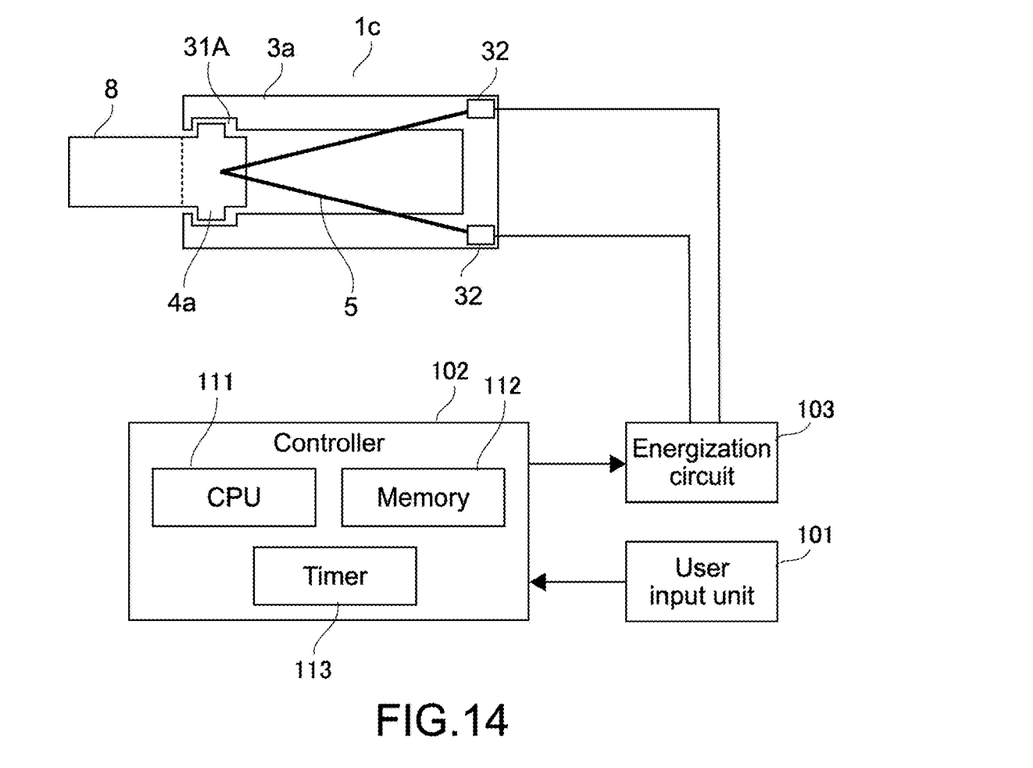
FIG. 14 A block diagram showing the functional configuration of the alarm apparatus 1d in FIG. 12.

FIG. 14 is a block diagram showing the functional configuration of such alarm apparatus 1d.

As shown in the figure, the alarm apparatus 1d includes a user input unit 101, a controller 102, an energization circuit 103 that supplies current to the shape-memory alloy wire 5 on the basis of a control signal from the controller 102, and the like.

The controller 102 includes a CPU 111, a memory 112, and a timer 113. The CPU 111 stores schedule information and alarm setting information in the memory 112. The schedule information and alarm setting information are input by a user using the user input unit 101. The schedule information includes information such as a time and date and content of schedule. The alarm setting information includes information such as conditions for outputting alarm (e.g., remaining time). The CPU 111 determines the timing of generating alarm on the basis of the current time and date of the timer 113, the schedule information, and the alarm setting information, and supplies a control signal for turning on the energization to the energization circuit 103. At this time, the control signal may be supplied so that an energization pattern corresponding to the content of schedule is generated on the energization circuit. The energization pattern represents a series of means of energization including various parameters such as time, the magnitude of current, the number of times, and a speed of a change in current.

Figure 23:
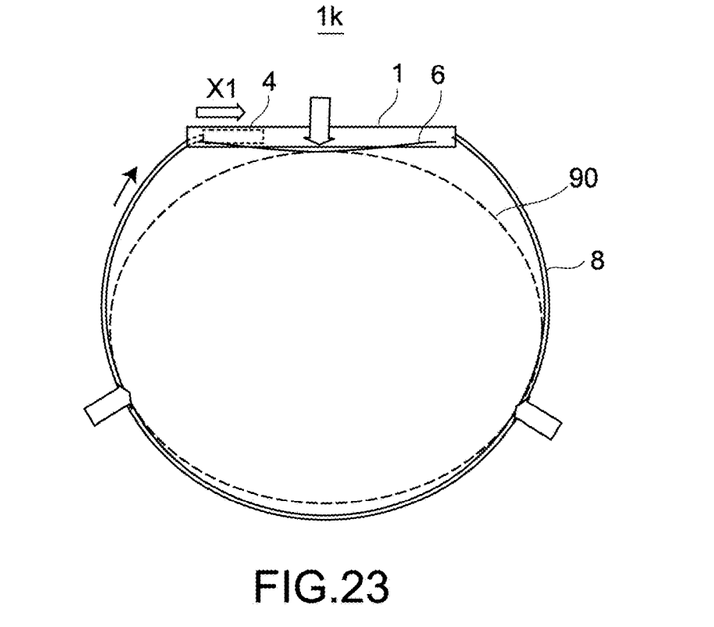
FIG. 23 A side view showing a modified example of the alarm apparatus.

Further, as shown in FIG. 23, the actuator 1 according to the first embodiment may be used to configure an alarm apparatus 1k. In this case, the actuator 1 and the strip-shaped member 8 are connected to each other in the orientation in which the elastic plate 6 projects toward the inside of the loop by being elastically deformed. This alarm apparatus 1k gives a feeling of pressure from the elastic plate 6 in addition to a feeling of tightness of the wrist 90 when the length of the loop formed by the actuator 1c and the strip-shaped member 8 is reduced, thereby giving a feeling of tapping.

Figure 24:
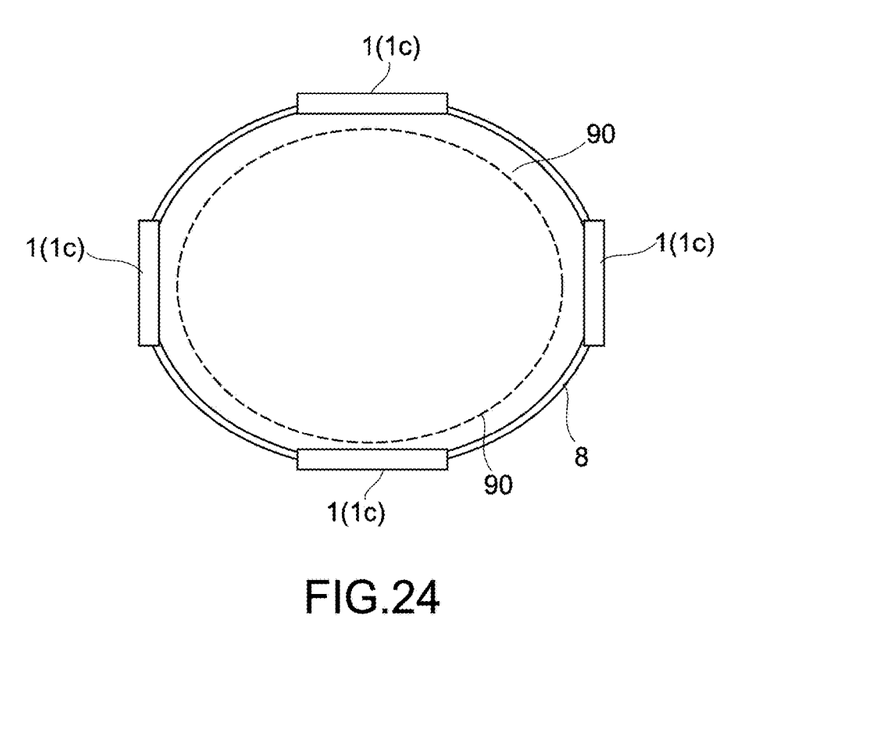
FIG. 24 A side view showing another modified example of the alarm apparatus.
Figure 25:
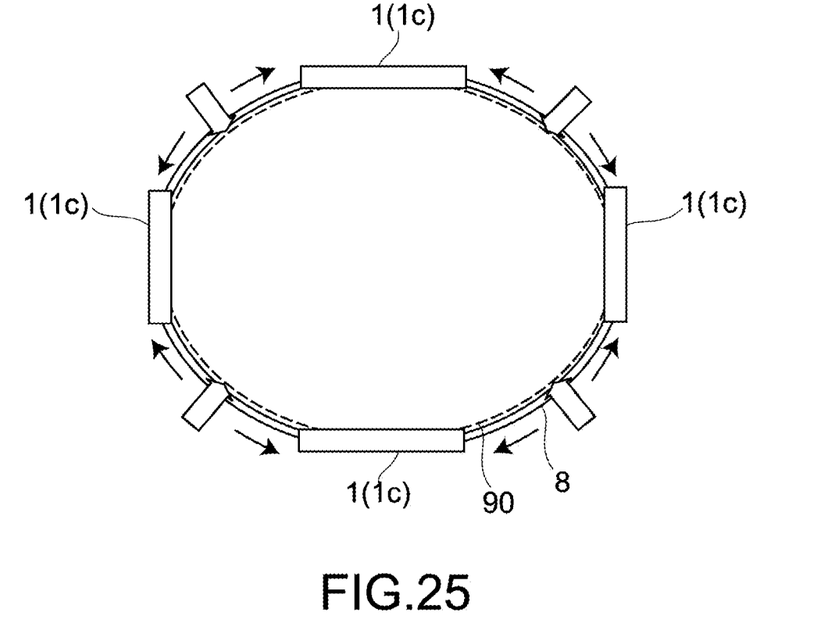
FIG. 25 A side view showing the alarm apparatus in FIG. 24 when being energized.

Further, by linking a plurality of actuators 1 according to the first embodiment or actuators 1c via the strip-shaped member 8 as shown in FIG. 24 and FIG. 25, it is possible to achieve a larger amount of contraction and evenly give a feeling of tightness to the entire periphery of the wrist 90.

<Fourth Modified Example>

Figure 15:
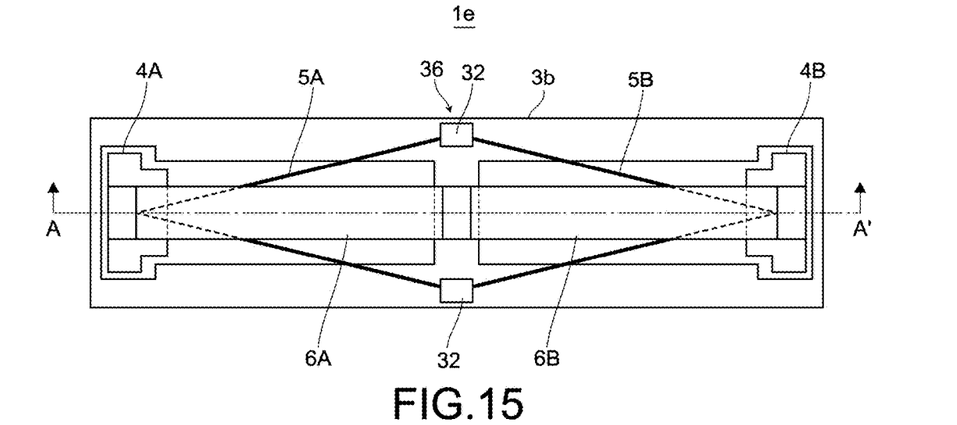
FIG. 15 A plan view showing a multi-driving actuator 1e according to a fourth modified example.
Figure 16:
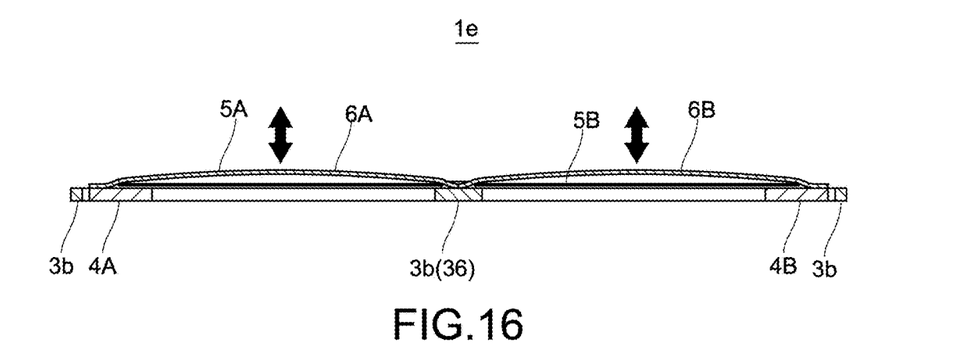
FIG. 16 A cross-sectional view of the multi-driving actuator 1e in FIG. 15.

FIG. 15 is a plan view showing a multi-driving actuator 1e according to a fourth modified example. FIG. 16 is a cross-sectional view of the multi-driving actuator 1e in FIG. 15.

This multi-driving actuator 1e is configured by combining two actuators 1 according to the first embodiment in the X-axis direction.

On both end portions of a holder 3b in the X-axis direction, a first slider 4A and a second slider 4B are arranged in a mirror-symmetrical orientation. To a central portion 36 of the holder 3b in the X-axis direction, two electrode units 32, 32 are provided. To the two electrode units 32, 32, one end portions of a shape-memory alloy wire 5A and a second shape-memory alloy wire 5B and the other end portions of the shape-memory alloy wire 5A and the second shape-memory alloy wire 5B are respectively bonded. To the first slider 4A and the central portion 36 of the holder 3, both end portions of a first elastic plate 6A are fixed. To the second slider 4B and the central portion 36 of the holder 3, both end portions of a second elastic plate 6B are fixed.

In this multi-driving actuator 1e, when the shape-memory alloy wire 5A and the second shape-memory alloy wire 5B are energized, the first slider 4A and the second slider 4B slide in a direction in which they come close to each other, and the first elastic plate 6A and the second elastic plate 6B are each elastically deformed to be in a predetermined warped state.

According to this configuration, because the necessary number of parts such as the holder 3b, the base plate 2 (FIG. 3), and the top plate 7 (FIG. 3) is one, it is possible to reduce the number of parts as compared with the case where two actuators are combined as they are.

<Fifth Modified Example>

Figure 17:
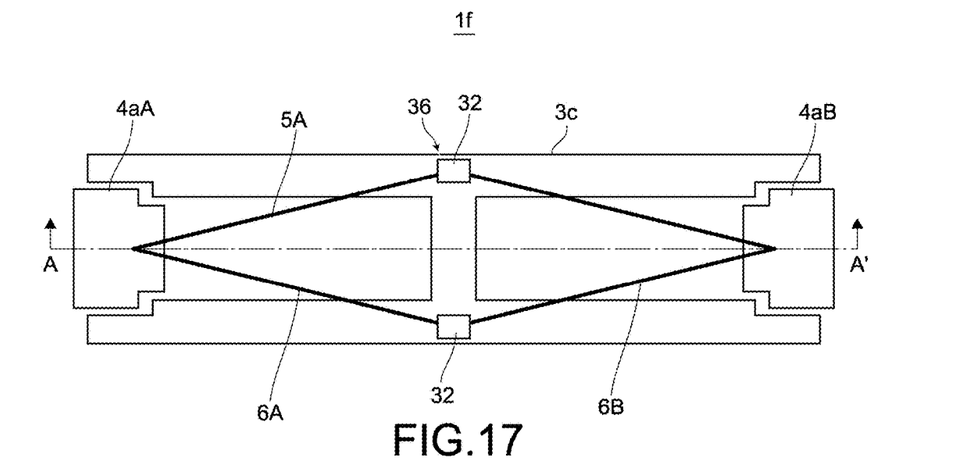
FIG. 17 A plan view showing a multi-driving actuator 1f according to a fifth modified example.
Figure 18:
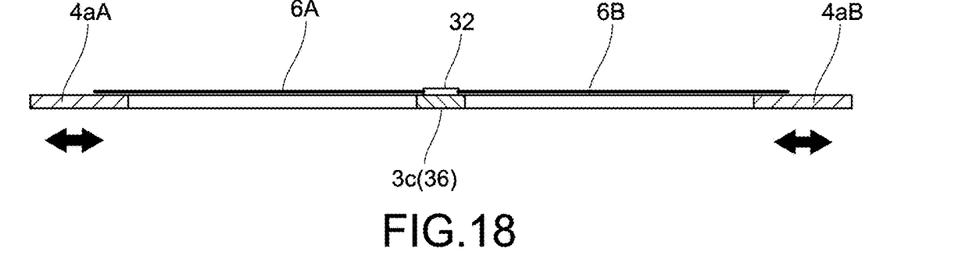
FIG. 18 A cross-sectional view of the multi-driving actuator 1f according to the fifth modified example.

FIG. 17 is a plan view showing a multi-driving actuator 1f according to a fifth modified example. FIG. 18 is a cross-sectional view of the multi-driving actuator 1f according to the fifth modified example.

This multi-driving actuator 1f is configured so that displacement of a first slider 4aA and a second slider 4aB is made to be an output of the multi-driving actuator 1f.

In this multi-driving actuator 1f, the first slider 4aA and the second slider 4aB slide in a direction in which they come close to each other when the shape-memory alloy wire 5A and the second shape-memory alloy wire 5B are energized. Therefore, it is possible to achieve the stroke that is two times as large as that of the actuator 1 according to the first embodiment.

<Sixth Modified Example>

Figure 19:
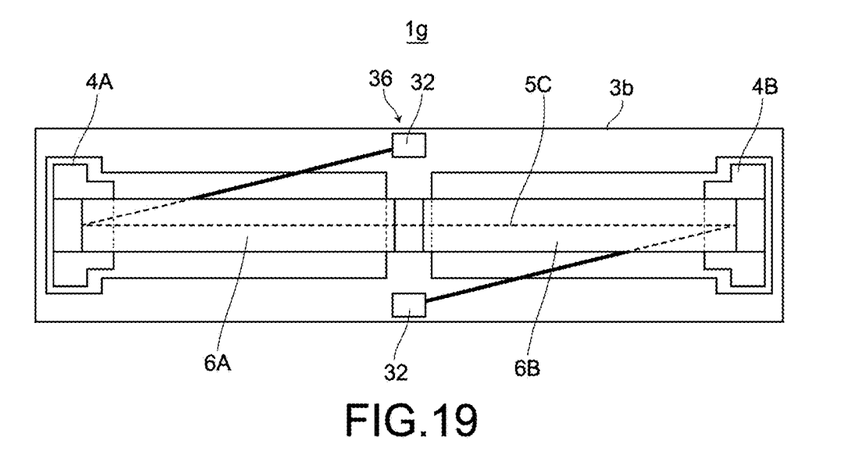
FIG. 19 A plan view showing a multi-driving actuator 1g according to a sixth modified example.

FIG. 19 is a plan view showing a multi-driving actuator 1g according to a sixth modified example.

This multi-driving actuator 1g is different from the multi-driving actuator 1e according to the fifth modified example in that one shape-memory alloy wire 5C is used. According to this configuration, it is possible to increase the amount of contraction the shape-memory alloy wire 5C when being energized. Specifically, it is possible to increase the stroke of the first slider 4A and the second slider 4B and the amount of displacement caused by the elastic deformation of the first elastic plate 6A and the second elastic plate 6B.

<Seventh Modified Example>

Figure 20:
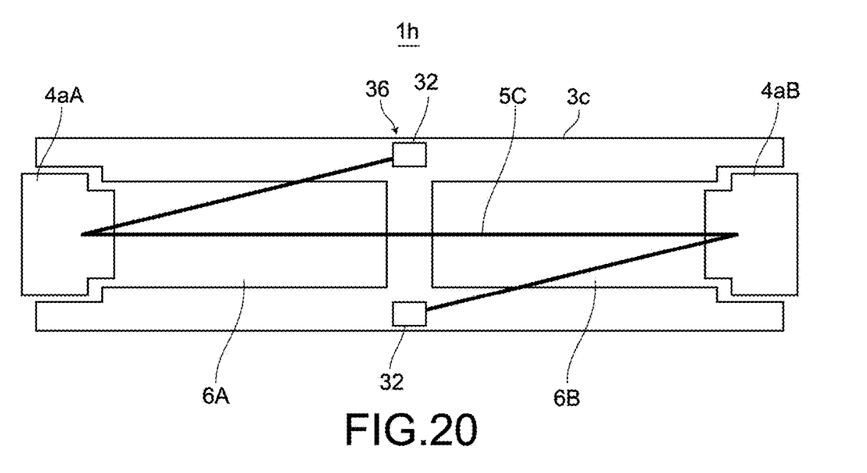
FIG. 20 A plan view showing a multi-driving actuator 1h according to a seventh modified example.

FIG. 20 is a plan view showing a multi-driving actuator 1h according to a seventh modified example.

This multi-driving actuator 1h employs the configuration in which the one shape-memory alloy wire 5C is used in the multi-driving actuator 1f according to the fifth modified example.

<Eighth Modified Example>

Figure 21:
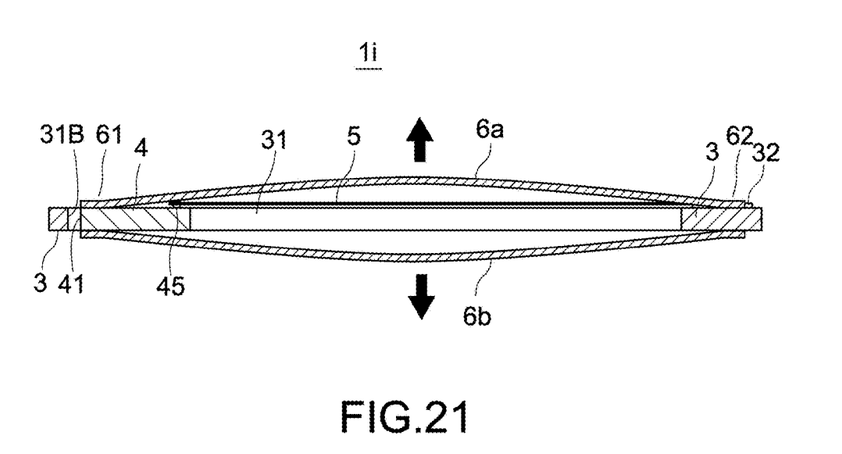
FIG. 21 A cross-sectional view showing a multi-driving actuator 1i according to an eighth modified example.

FIG. 21 is a cross-sectional view showing a multi-driving actuator 1i according to an eighth modified example.

To this multi-driving actuator 1i, not only as the elastic plate 6 (first elastic plate 6a) that is elastically deformed to project above the opening portion 71 (FIG. 3) of the top plate 7 when the shape-memory alloy wire 5 is energized but also a second elastic plate 6b that is elastically deformed to project below an opening portion (not shown) provided to the base plate 2 similarly are provided. Both end portions of the second elastic plate 6b are fixed to the slider 4 and the one end portion of the holder 3 similarly to the first elastic plate 6a. On the other end portion of the holder 3, the slider holding space 31A is provided.

According to this the multi-driving actuator 1i, with a little number of parts, it is possible to generate displacement to project above the upper surface of the top plate 7 and displacement to project below the lower surface of the base plate 2 at the same time.

<Ninth Modified Example>

Figure 22:
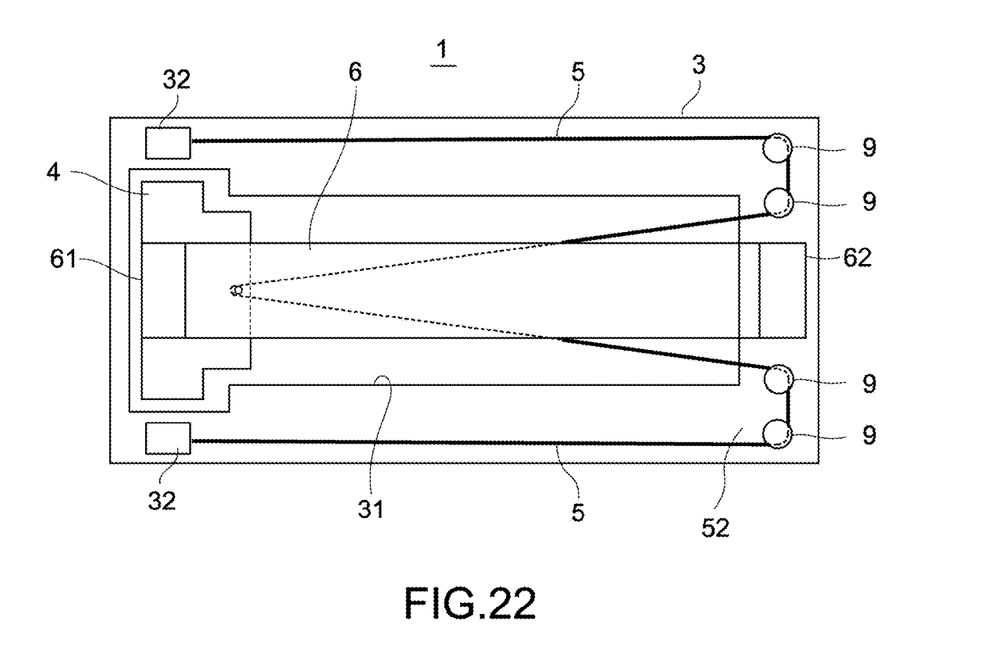
FIG. 22 A plan view showing a multi-driving actuator 1j according to a ninth modified example.

FIG. 22 is a plan view showing a multi-driving actuator 1j according to a ninth modified example.

In this actuator 1j, the shape-memory alloy wire 5 is configured to be pulled around as long as possible by using a wire guide member 9 such as a pulley and a shaft. Accordingly, it is possible to increase the amount of contraction when the shape-memory alloy wire 5 is energized, the amount of sliding displacement of the slider 4, and the amount of displacement caused by elastic deformation of the elastic plate 6.

It should be noted that the present technology may take the following configurations.

(1) An actuator, including:
a holder;
a slider slidably held by the holder;
a wire locked at the slider, the wire causing the slider to slide by contracting in at least a line length direction when being energized; and
a pair of electrode units, one end of the wire being bonded to one of the electrode units, the other end of the wire being bonded to the other of the electrode units.

(2) The actuator according to (1) above, further including an elastic plate, one end portion of the elastic plate being fixed to the slider, the other end portion of the elastic plate being fixed to a position, the position being away from the slider in a sliding direction of the slider, the elastic plate being elastically deformed in a direction perpendicular to a sliding surface of the slider by a change in a distance between the one end portion and the other end portion along with sliding of the slider when the wire is energized.

(3) The actuator according to (2) above, in which the elastic plate is elastically deformed in a direction away from the sliding surface at the time of the energization.

(4) The actuator according to (2) or (3) above, in which the elastic plate is in a state of being elastically deformed in the direction away from the sliding surface by initial distortion at the time of non-energization.

(5) The actuator according to any one of (1) to (4) above, in which the pair of electrode units is provided to the holder.

(6) The actuator according to any one of (2) to (5), in which the wire is pulled across a surface in parallel with the sliding surface.

(7) The actuator according to (6) above, further including a contact prevention wall that prevents the wire pulled across the surface in parallel with the sliding surface from being in contact with each other.

(8) The actuator according to any one of (2) to (7) above, in which the elastic plate includes a first elastic plate and a second elastic plate that are elastically deformed in directions away from each other from the sliding surface at the time of the energization.

(9) The actuator according to any one of (1) to (8) above, in which
the slider includes a first slider and a second slider slidably held by the holder along the same axial direction, and
the wire is locked at the first slider and the second slider, and causes the first slider and the second slider to slide in a direction pulling each other by contracting in at least the line length direction when being energized.

(10) The actuator according to any one of (2) to (8) above, in which
the slider includes a first slider and a second slider slidably held by the holder along the same axial direction,
the wire is locked at the first slider and the second slider, and causes the first slider and the second slider to slide in a direction pulling each other by contracting in at least the line length direction when being energized, and
the elastic plate includes
a first elastic plate, one first end portion of the first elastic plate being fixed to the first slider, the other second end portion of the first elastic plate being fixed to a position, the position being away from the first slider in a sliding direction of the first slider, the first elastic plate being elastically deformed in a direction perpendicular to a sliding surface of the first slider by a change in a distance between the first end portion and the second end portion along with sliding of the first slider when the wire is energized, and
a second elastic plate, one third end portion of the second elastic plate being fixed to the second slider, the other fourth end portion of the second elastic plate being fixed to a position, the position being away from the second slider in a sliding direction of the second slider, the second elastic plate being elastically deformed in a direction perpendicular to a sliding surface of the second slider by a change in a distance between the third end portion and the fourth end portion along with sliding of the second slider when the wire is energized.

REFERENCE SIGNS LIST 1 actuator
1d, 1k alarm apparatus
2 base plate
3 holder
4 slider
4A first slider
4B second slider
5 shape-memory alloy wire
6 elastic plate
6A first elastic plate
6B second elastic plate
8 strip-shaped member
21 contact prevention wall
32, 32 electrode unit
45 locking portion

The invention claimed is:

1. An actuator, comprising:
a holder;
a slider slidably held by the holder;
a wire locked at a first position on the slider, the wire causing the slider to slide by contracting in at least a line length direction when being energized, the wire having first and second ends, and the wire being locked on the slider at a fold in the wire;
first and second electrode units, the first end of the wire being bonded to the first electrode unit, the second end of the wire being bonded to the second electrode unit; and
an elastic plate having first and second end portions, the first end portion of the elastic plate being fixed to the slider at a second position different from the first position, the second end portion of the elastic plate being fixed to the holder at a position separated from the slider in a sliding direction of the slider,
wherein, when the wire is energized, the slider slides in the sliding direction and the elastic plate elastically deforms in a direction perpendicular to the sliding direction due to a change in a distance between the first end portion of the elastic plate and the second end portion of the elastic plate from sliding of the slider.

2. The actuator according to claim 1, wherein the elastic plate elastically deforms in a direction perpendicular to the sliding direction when the wire is energized.

3. The actuator according to claim 2, wherein the elastic plate is in a state of being elastically deformed in a direction perpendicular to the sliding direction by an initial distortion when the wire is not energized.

4. The actuator according to claim 3, wherein the first and second electrode units are provided on the holder.

5. The actuator according to claim 4, wherein, when the wire is energized, the wire is pulled across a in plane parallel to the sliding direction.

6. The actuator according to claim 5, further comprising a contact prevention wall positioned relative to the holder to prevent the wire from contacting a surface, other than contact at the fold and at the first and second ends of the wire, while the wire is pulled across the plane parallel to the sliding direction.

7. The actuator according to claim 6, wherein
the elastic plate includes a first elastic plate and a second elastic plate that, when the wire is energized, elastically deform in directions away from each other and perpendicular to the sliding direction.

8. The actuator according to claim 1, wherein
the slider includes a first slider and a second slider held by the holder to slide along a same axis, and
the wire is locked at the first position on the slider by being locked at a position on the first slider and by being locked at a position on the second slider such that, when the wire is energized, the first slider and the second slider to pull toward each other by contraction of the wire.

9. The actuator according to claim 1, wherein
the slider includes a first slider and a second slider held by the holder to slide along a same axis,
the wire is locked at the first position on the slider by being locked at a position on the first slider and by being locked at a position on the second slider such that, when the wire is energized, the first slider and the second slider to pull toward each other by contraction of the wire, and
the elastic plate includes
   a first elastic plate, a first end portion of the first elastic plate being fixed to the first slider, a second end portion of the first elastic plate being fixed to a position separated from the first slider in a sliding direction of the first slider, the first elastic plate being elastically deformed in a direction perpendicular to the sliding direction of the first slider by a change in a distance between the first end portion and the second end portion of the first slider upon sliding of the first slider when the wire is energized, and
   a second elastic plate, a first end portion of the second elastic plate being fixed to the second slider, a second end portion of the second elastic plate being fixed to a position separated from the second slider in a sliding direction of the second slider, the second elastic plate being elastically deformed in a direction perpendicular to the sliding direction of the second slider by a change in a distance between the first end portion and the second end portion of the second slider upon sliding of the second slider when the wire is energized.

10. An alarm apparatus, comprising:
an actuator including
   a holder,
   a slider slidably held by the holder,
   a wire locked at a first position on the slider, the wire causing the slider to slide by contracting in at least a line length direction when being energized, the wire having first and second ends and a fold between the first and second ends, and the wire being locked on the slider at the fold in the wire,
   first and second electrode units, the first end of the wire being bonded to the first electrode unit, the second end of the wire being bonded to the second electrode unit; and
a strip-shaped member having first and second end portions, the first end portion of the strip-shaped member being fixed to the slider of the actuator at a second position different from the first position, the second end portion of the strip-shaped member being fixed to distal end portion of the holder, the distal end portion of the holder being separated from the slider in a sliding direction of the slider,
wherein, when the wire is energized, the slider slides in the sliding direction and the strip-shaped member elastically deforms in a direction perpendicular to the sliding direction due to a change in a distance between the first end portion of the strip-shaped member and the second end portion of the strip-shaped member from sliding of the slider, and
wherein elastic deformation of the strip-shaped member in the direction perpendicular to the sliding direction enables the strip-shaped member to provide an alarm notification to a user.

\* \* \* \* \*